Patented Mar. 16, 1954

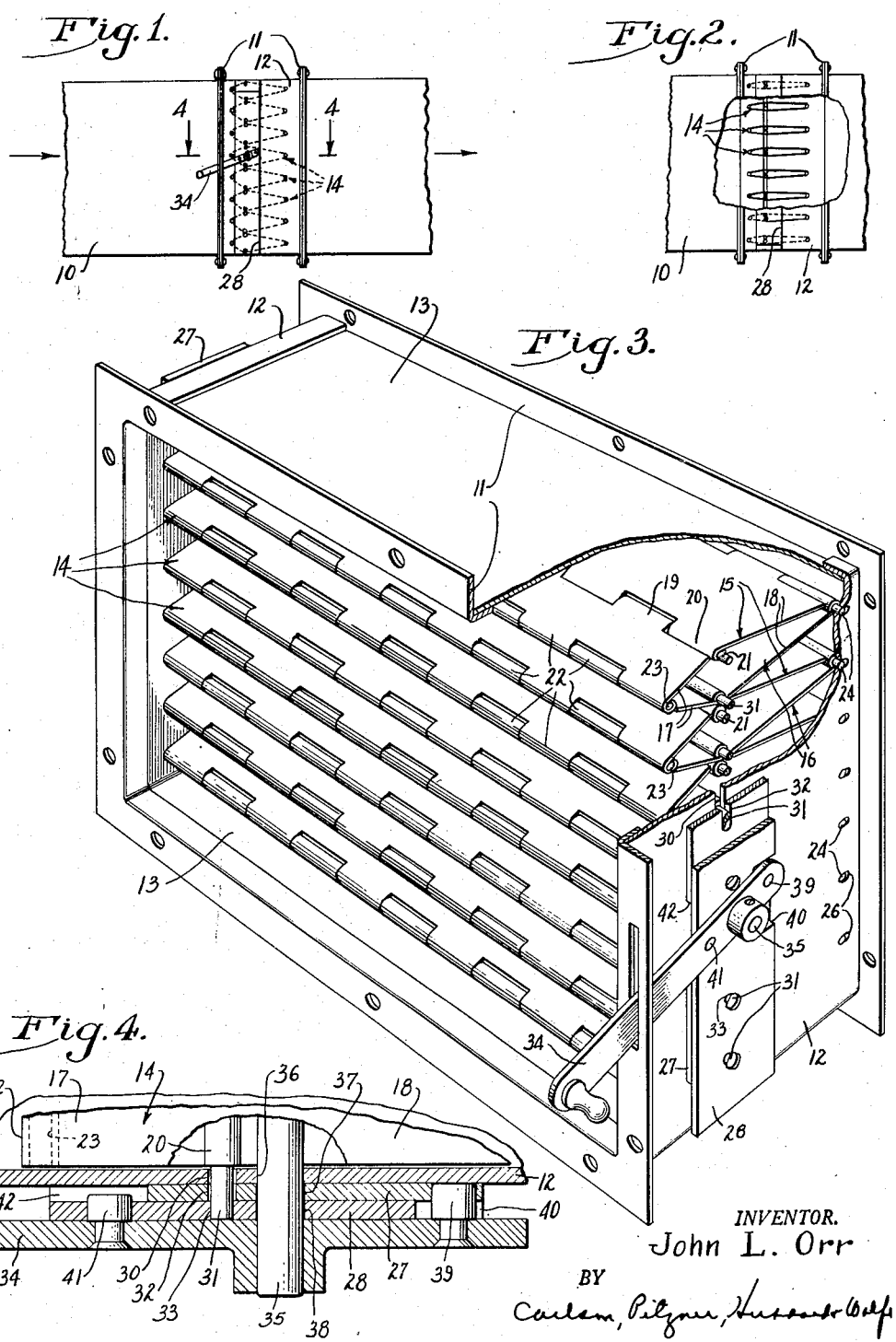

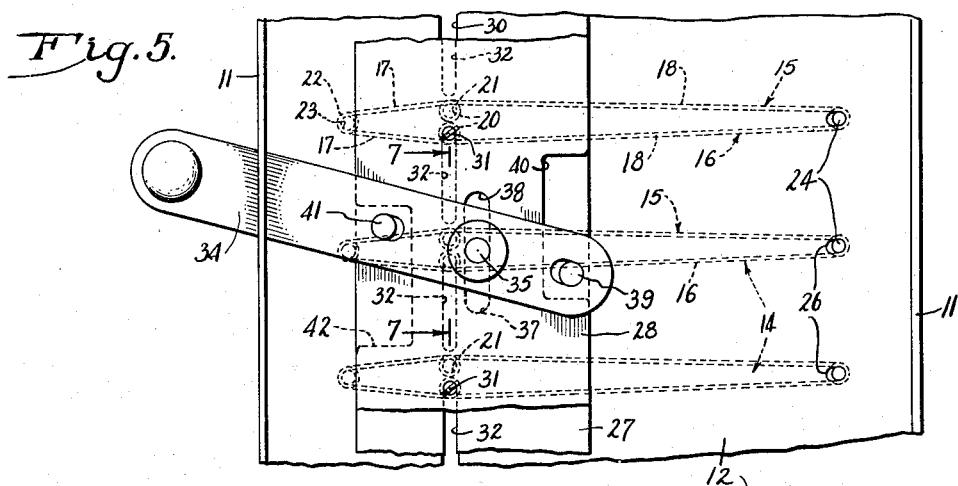
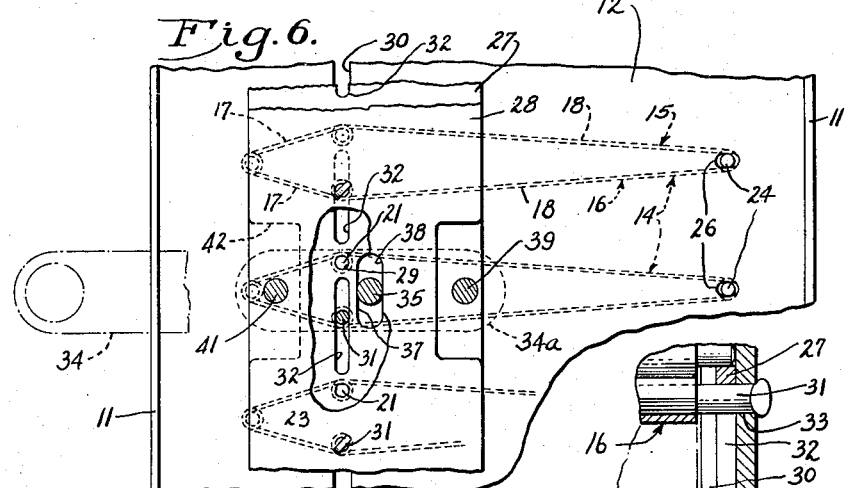
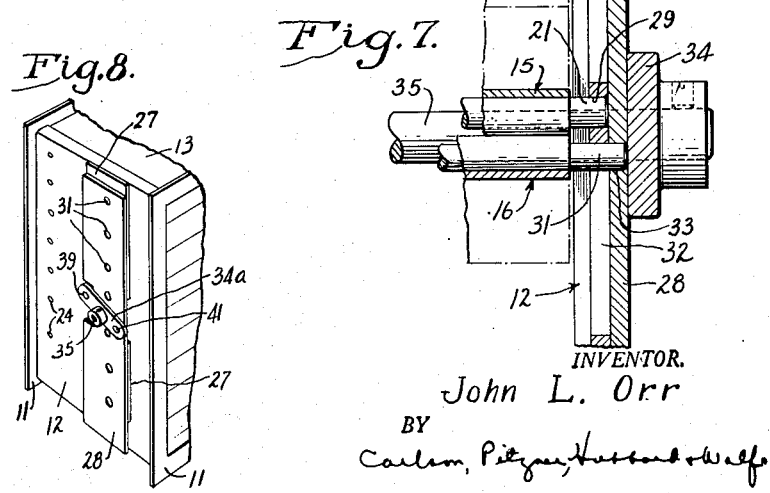

2,672,088

UNITED STATES PATENT OFFICE 2,672,088

AIR FLOW CONTROL DAMPER

John L. Orr, Rockford, Ill., assignor to Barber-Colman Company, Rockford, Ill., a corporation of Illinois Continuation of application Serial No. 734,093, March 12, 1947. This application June 28, 1950, Serial No. 170,848

14 Claims. (Cl. 98—41)

This invention relates to selectively adjustable dampers for regulating the flow of air in air conditioning or ventilating systems and the like.

The general object is to provide such a damper which is simple and inexpensive to manufacture, which is adapted for use in so-called high pressure air conditioning systems, which reduces the pressure of the air or its velocity without increasing the noise incident to flow of the air past the damper louvers, which maintains a uniform direction and distribution of the air flow across the duct in all degrees of opening of the damper, which reduces turbulence by providing true laminar flow over louvers of air foil shape, and which offers minimum resistance to the flow of air when fully open.

A more detailed object is to provide a damper in which opening and closing of the air duct are effected by lateral expansion and contraction of the individual damper louvers.

Another object is to provide a damper in which each louver is composed of two walls connected together along their edges and flexible intermediate the edges to increase and decrease the thickness of the louver.

A further object is to provide a novel mechanism for actuating the walls of the louvers to open and close the passages between the adjacent louvers.

The invention also resides in the novel construction of the louvers which simplifies their manufacture and provides a generally air foil cross-sectional shape.

Other objects and advantages of the invention will become apparent from the following detailed description taken in connection with the accompanying drawings, in which:

Figure 1 is an elevational view of a duct equipped with a damper embodying the present invention, the damper being fully closed.

Fig. 2 is a similar view but with part of the damper frame broken away and the louvers shown in fully open position.

Fig. 3 is a perspective view of the damper with part of the frame broken away.

Fig. 4 is a section taken along the line 4—4 of Fig. 1.

Figs. 5 and 6 are fragmentary side elevational views respectively showing the damper fully and partially open.

Fig. 7 is a section taken along the line 7—7 of Fig. 5.

Fig. 8 is a fragmentary perspective view similar to Fig. 2 taken from the other side of the damper.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claims.

While the improved damper may be disposed within a duct or at an end thereof depending on the installation in which it is used, it is shown in the drawings interposed between and connected to spaced parts of a duct 10 through which air is intended to flow in the direction indicated by the arrows in Fig. 1. Herein, the damper frame comprises axially spaced rectangular end frames 11 rigidly connected by side plates 12 and top and bottom plates 13 which define a rectangular air passage. Flanges on the frames 11 abut against corresponding flanged ends on the duct sections and are riveted or otherwise fastened thereto.

The damper proper comprises a plurality of parallel louvers 14 laterally spaced apart across the duct passage and each adapted for lateral expansion into and out of contact with the sides of the next adjacent louvers or the plates 13 so as to vary the widths of the air spaces between the louvers and thereby regulate the amount of air flowing through the duct or close the duct passage completely (Fig. 1). Where it is desired to minimize the noise incident to the flow of air past the louvers and to avoid turbulence and thereby facilitate the air flow, each louver is made of generally air foil or tear drop cross-sectional shape. That is to say, opposite side surfaces of the louvers converge in opposite directions toward the louver edges from a point of maximum thickness intermediate the edges.

To permit of such lateral expansion and contraction, each louver 14 is composed of two vanes or walls 15 and 16 which are connected together along at least one of their corresponding edges and are laterally separable so that by moving one or both of the walls outwardly, the thickness of the louver may be increased and the space between adjacent louvers correspondingly decreased to throttle the flow of air through the damper. Where an air foil cross-section is desired, each of the walls 15 and 16 is formed by two flat and relatively rigid plates 17 and 18, the adjacent edge portions of which are bent inwardly to form lugs 19 and 20 which interfit with each other and are connected by a pin 21 in the case of the louver wall 15 and by a pin 31 in the case of the other wall 16. The hinges thus formed intermediate the edges of the louver walls 15 and 16 permit the necessary flexure of the walls. Preferably, the plates 18 are substantially wider than the plates 17, so that the edgewise taper toward one edge of the louver will be more gradual than on the other edge which is formed by the narrower plates 17. The outer edges of the latter are similarly formed with inwardly bent interfitting lugs 22 which receive a pintle 23 and form therewith an edge hinge. In a similar way, the outer edges of the plates 18 are notched and curled inwardly around a pintle 24 to form a second edge hinge at the other edge of the louver. The hinge pins are, it will be observed, disposed inside of the louver so that the exterior of each hinge presents a relatively smooth rounded external surface across which air may flow without the creation of substantial turbulence therein.

The four plates 17 and 18 thus hinged together form a somewhat flattened tube which may be expanded laterally by separation of the hinge intermediate pins 21 and 31, this being accompanied by movement of the pins 23 and 24 toward each other. Thus, with the louvers mounted side by side and laterally spaced across the damper frame, the widths of the air spaces between the louvers and between the terminal louvers and the frame plates 13 will be increased as the pins 21 and 31 of all of the louvers are separated, the air passages becoming completely closed when the hinges of the adjacent louvers contact each other or the plates 13 as shown in Fig. 1. Then, as these hinges of the individual louvers are moved together, the louver walls become separated progressively and the air passages through the damper correspondingly widened until the limit open position shown in Figs. 2 and 5 is reached.

In all degrees of expansion, it will be observed that the louver presents an external contour generally simulating a so-called tear drop or air foil shape thereby providing for the flow of air past the louver with minimum turbulence. To utilize this air foil effect to best advantage, the damper is mounted in the duct so that louver edges of lesser taper formed by the plates 18 project in the direction of the air flow through the duct (see Figs. 1 and 2), while the edges of greater taper formed by the plates 17 face upstream.

To support the several louvers for opening and closing of the air passage in the manner above described, the pins 24 are, in this instance, extended beyond the ends of the louvers and projected through slots 26 in the side plates 12 adjacent one edge, these being somewhat elongated in the direction in which the pins 24 move during expansion and contraction of the louver. The slots are spaced in a manner such that the intermediate hinges of all of the adjacent louvers will come into contact with each other simultaneously, the sides of the terminal louvers contacting the frame plates 13 at the same time (see Fig. 1). The other edge hinge 23 is unsupported and thus is also free to move toward and away from the plane in which the pins 21 and 31 are guided.

To move the hinge pins 21 and 31 toward or away from each other to open or close the damper, the invention contemplates the use of at least one actuating bar pivotally connected at spaced points to the corresponding pins of the different louvers and mounted for endwise movement transversely of the planes of the louvers. Herein, both of the pins 21 and 31 of each of the louvers are shifted in opposite directions simultaneously to effect the contraction or expansion and accordingly a pair of actuating bars 27 and 28 are employed preferably at each end of the louvers. While the bars of each pair may, if desired, be disposed in the same plate by proper sloping of the ends of the hinge pins 21 and 31, they are in the present instance disposed in different planes, the bar 27 lying against the outer surface of the frame plate 12 and is formed at spaced points with holes 29 that receive the outwardly projecting ends of the louver pins 21 which are shorter than the pins 31 and extend through slots 30 formed in the frame plate 12. These slots are elongated in the planes of the pins 21 and 31 and their side walls serve as guides for these pins. In a similar way, the ends of the other and longer hinge pins 31 extend through the slots 30 and also through elongated slots 32 in the bar 27 into holes 33 spaced along the bar 28 which is disposed adjacent the other surface of the bar 27. Thus, both pairs of bars and their connected hinge pins are in this instance adapted to slide endwise along the frame slots 30, and the outer bars 28 and their connected pins 31 are slidable along the slots 32 relative to the inner bars 27.

The actuating members or bars 27 and 28 are thus connected to the respective side walls 15 and 16 of each louver and are guided for movement in a plane perpendicular to the planes of the louvers. By moving these members simultaneously and through equal distances in opposite directions, the walls 15 and 16 of each pair remain spaced equidistant from a center plane through their axis 24 and each louver will be expanded or contracted laterally while remaining in a fixed edgewise plane coinciding with the plane of the guided slots 26 of the louver. Such opposite but synchronized shifting of the bars 27 and 28 of the pairs on opposite sides of the damper frame is effected in the present instance by swinging a lever 34 (Fig. 3) which lies alongside the exterior of the damper frame. This lever is fast on a shaft 35 which extends transversely of the damper frame and through one of the tubular louvers between and parallel to the hinge pins 21 and 31 with its opposite ends journaled at 36 (Fig. 4) in the frame plates 12 and projecting through slots 37 and 38 in the bars 27 and 28 elongated longitudinally of the latter. Adjacent the fulcrum shaft 35 and spaced from the latter on one side thereof is a pin 39 which projects into a hole in the bar 27 so as to be pivotally connected thereto. The pin projects through a longitudinally elongated notch 40 in the bar 28. Spaced an equal distance from the fulcrum shaft 35 on the other side thereof is a pin 41 which projects through a hole in the bar 28 into a notch 42 in the bar 27.

A similar connection including a lever 34ª (see Fig. 8) is provided between the other end of the shaft 35 and the bars 27 and 28 on the other side of the damper frame, so that equalized actuating forces for swinging the walls 15 and 16 toward and away from each other will be applied at both ends of the walls. Thus, the walls may be made of any desired length without danger of cracking or bending in their mountings.

When the actuating lever 34 is swung downwardly as shown in Figs. 1 and 3, the hinge pins 21 and 31 of the respective louvers will be separated to a maximum degree to hold the walls 15 and 16 at the maximum included angle, all of the louvers 14 being expanded into side contact with each other or the frame plates 13 thereby completely closing off the air passage through the damper frame. Now, as the lever is raised from the closed position, the bars 28 will be moved upwardly and the bars 27 will slide downwardly thus moving the hinge pins 21 and 31 of each louver toward each other and correspondingly separating the adjacent walls of the adjacent louvers 14 so as to permit a flow of air through the damper determined by the width of the air spaces thus formed between the louvers 14. The maximum opening of the damper will obtain when the parts reach the position shown in Figs. 2 and 5. As the louvers are thus contracted laterally to open the damper passage, their width is correspondingly increased, that is, the hinges 23 and 24 are shifted toward each other while remaining in the same horizontal plane in all degrees of damper opening. During expansion of the louvers, the floating hinge pins 23 and 24 move away from each other and the fixed plane in which the pins 21 and 31 are guided. In all degrees of opening of the damper, the positions of the parts are effectually retained by friction at the hinge pivots, between the bars 27 and 28, and at the different guide surfaces. Moreover, both the expansion and the contraction of the louvers 14 are effected positively by movement of the actuating lever 34.

With the louver constructions described above, it will be apparent that the louvers remain parallel to the direction of air flow in all degrees of opening of the damper. This coupled with their simulated tear drop cross section avoids the creation of any substantial turbulence in the passing air or a change in the direction of flow thereof. The louvers thus provide for true laminar flow of the air through the duct 10 with a minimum pressure drop between opposite sides of the damper. A tight closure of the air passage is effected when the louvers are expanded into full contact with each other.

The damper is especially adapted for use in air conditioning systems which are operated at relatively high pressure. Thus air flow is distributed uniformly across the duct and the noise incident to the flow of air at relatively high velocity past the louvers is minimized by virtue of the air foil sections. As the louvers are expanded and the damper becomes closed, the sectional contour of the louvers approaches more closely to a perfect tear drop cross section so that the noise produced by the air flow through the damper actually decreases as the damper becomes closed. In addition, all of the parts may be produced as simple sheet metal stampings thereby minimizing the overall cost of the damper.

This application is a continuation of my prior application Serial No. 734,093 filed March 12, 1947, now abandoned.

I claim as my invention:

1. An air flow control damper having, in combination, a plurality of louvers each comprising two flat plates having curled lugs spaced along the edges of the plates on one side thereof with the lugs on one plate edge interfitting with those on the other plate, a pin extending through the interfitting lugs to form a hinge with the ends of the pin projecting beyond the ends of the plates, two similarly formed flat plates with the lugs on one edge of each plate interfitting and connected by a pin to form a hinge, the lugs on the corresponding other edges of the first and second plates interfitting, pintles extending through the latter lugs and beyond the ends of said plates to unite the four plates and form a tube with all of said lugs disposed within the tube, a generally rectangular frame defining an air passage and supporting said projecting pin ends in spaced parallel relation, a member engaging the corresponding pintle ends on each louver and mounted on said frame for movement in the plane of the frame, a second member engaging the other pintle ends and mounted on said frame for independent movement in said plane, and a common actuator for said members operable when actuated to move the members in opposite directions.

2. An air flow control damper having, in combination, a plurality of louvers each comprising two flat plates pivotally connected along one of their edges to form a hinge, a second pair of plates pivotally connected along one edge to form a second hinge, means pivotally connecting the corresponding other edges of the plates of different pairs to form third and fourth hinges, a generally rectangular frame defining an air passage and supporting the first hinge of the different louvers in laterally spaced relation, a member guided by said frame for movement in the plane of said passage and pivotally connected to the third hinge of each of said louvers, a second member pivotally connected to the fourth hinges of said louvers, and means by which said members may be shifted in opposite directions simultaneously.

3. An air flow control damper having, in combination, a plurality of louvers each comprising two flat plates pivotally connected along one of their edges to form a hinge, a second pair of plates pivotally connected along one edge to form a second hinge, means pivotally connecting the corresponding other edges of the plates of different pairs to form third and fourth hinges, a generally rectangular frame defining an air passage and supporting the first hinge of the different louvers in laterally spaced relation, the pintles of said third and fourth hinges projecting through slots in said frame and being guided for movement in the plane of said air passage, a bar pivotally connected to the projecting pintles of said third hinges and having slots therein paralleling said frame slots and receiving the projecting pintles of said fourth hinges, a second bar pivotally connected to said last mentioned pintles, and means by which said bars may be moved in opposite directions simultaneously.

4. An air flow control damper having, in combination, a plurality of louvers each comprising two plates pivotally connected together along one edge to form an edge hinge, a second pair of plates pivotally connected together along one edge to form a second edge hinge, means pivotally connecting the corresponding other edges of the plates of each pair to form two hinges intermediate the louver edges and unite said four plates to form a tube laterally expansible and contractible by movement of the intermediate hinges away from and toward each other, means supporting one of said edge hinges of the different louvers in fixed spaced parallel relation while leaving the other edge hinge free to float laterally, a member connected to the corresponding intermediate hinge of each louver, and a second member connected to the other intermediate hinge of each louver.

5. An air flow control damper having, in combination, a plurality of louvers each comprising two plates pivotally connected together along one edge to form an edge hinge, a second pair of plates pivotally connected together along one edge to form a second edge hinge, means pivotally connecting the corresponding other edges of the plates of each pair to form two hinges intermediate the louver edges and unite said four plates to form a tube laterally expansible and contractible by movement of the intermediate hinges away from and toward each other, means supporting one of said edge hinges of the different louvers in fixed spaced parallel relation, two bars extending across the opposite ends of said louvers and each connected to the corresponding one of said intermediate hinges of the different louvers, two bars disposed adjacent said first mentioned bars and each connected to the other intermediate hinges of each louver, a shaft extending longitudinally through one of said louvers and slots in each of said bars, and means connecting opposite ends of said shaft and the respective bars for movement of the latter in opposite directions during turning of the shaft in one direction.

6. An air flow control damper having, in combination, a plurality of louvers each comprising two plates pivotally connected together along one edge to form an edge hinge, a second pair of plates pivotally connected together along one edge to form a second edge hinge, means pivotally connecting the corresponding other edges of the plates of each pair to form two hinges intermediate the louver edges and unite said four plates to form a tube laterally expansible and contractible by movement of the intermediate hinges away from and toward each other, said edge and intermediate hinges of each tubular louver being disposed within the latter so that the louver presents a smooth external surface tapering in opposite directions to the louver edges from said intermediate hinges, means supporting one of said edge hinges of the different louvers in fixed spaced parallel relation, and means connecting the corresponding intermediate hinges of each louver and operable to expand or contract all of the louvers simultaneously.

7. An air flow control member having, in combination, a plurality of pairs of plates swingable about laterally spaced parallel pivots, the plates of each pair diverging away from their pivots, a frame supporting said pivots at opposite ends of the plates, two alined pins on the corresponding plate of each pair projecting parallel to the pivot thereof and from opposite ends of the plate near the free edge thereof, similar but longer pins projecting from opposite ends of each of the other plates of each pair, said pins projecting through openings in said frame, bars extending across opposite ends of all of said plates and pivotally connected at spaced points to each of said first mentioned pins, said bars being slotted longitudinally to receive said longer pins, a second pair of bars lying alongside said first bars and each pivotally connected at spaced points to said longer pins, a shaft journaled in said frame and disposed between two of said plates and parallel to said pivots, an actuating member by which said shaft may be turned, and connections between said shaft and each of said bars and operable during turning of the shaft in either direction to move said first bars endwise in one direction and simultaneously move said second bars an equal distance in the opposite direction.

8. An air flow control member having, in combination, means defining a plurality of laterally spaced fixed parallel pivots, a plurality of pairs of plates swingable about said pivots, the plates of each pair diverging away from their pivots, two aligned pins on each of the corresponding plates of each pair projecting parallel to the pivot thereof and from opposite ends of the plate at the free edge thereof, similar pins projecting from opposite ends of each of the other plates of each pair, bars extending across opposite ends of all of said plates and pivotally connected at spaced points to each of said first mentioned pins, a second pair of bars each pivotally connected at spaced points to the pins of said other plates and lying alongside the corresponding one of said first bars, and actuating mechanism connected to each of said bars and movable in either direction to shift said first bars endwise in one direction and simultaneously move said second bars an equal distance in the opposite direction whereby to swing the plates of each of said pairs toward or away from each other.

9. An air flow control member having, in combination, a plurality of pairs of plates swingable about laterally spaced parallel pivots, the plates of each pair diverging away from their pivots, a frame supporting said pivots, a pin on the free end portion of each plate projecting parallel to and spaced from the pivot thereof, the pin on one plate of each pair being shorter than the pin on the other plate, a bar extending across the ends of all of said plates and pivotally connected at spaced points to said shorter pins, said bars being slotted longitudinally to receive the longer pins, a second bar lying alongside said first bar and pivotally connected at spaced points to said longer pins, and actuating mechanism by which said bars may be moved endwise and transversely of the ends of said plates to thereby swing the plates of each pair toward or away from each other.

10. An air flow control member having, in combination, a plurality of pairs of plates swingable about laterally spaced parallel pivots, the plates of each pair diverging away from their pivots, a frame supporting said pivots, an endwise movable bar extending across the ends of said plates and pivotally connected at spaced points to one plate of each pair at a point spaced from the pivot thereof, a second endwise movable bar disposed adjacent said first bar and similarly connected pivotally to the other plates, and actuating mechanism connecting said bars for simultaneous endwise movement in opposite directions to swing the plates of each pair toward or away from each other.

11. An air flow control member having, in combination, a plurality of pairs of plates swingable about parallel pivots laterally spaced apart and in a row, the plates of each pair diverging away from their pivots, a frame supporting said pivots, an endwise movable bar extending across the ends of said plates and parallel to said row of pivots, and means pivotally connecting said bar at spaced points to one plate of each pair, and actuating means by which said bar may be shifted endwise back and forth longitudinally of said row of pivots whereby to swing one plate of each pair in a corresponding direction relative to the other plate of the pair.

12. An air flow control member having, in combination, a plurality of pairs of plates swingable about laterally spaced parallel pivots, the plates of each pair diverging away from their pivots, a frame supporting said pivots, an endwise movable bar extending across the ends of said plates and pivotally connected at spaced points to one plate of each pair at a point spaced from the pivot thereof, a second endwise movable bar disposed adjacent said first bar and similarly connected pivotally to the other plates, a rotary member journaled on said frame to turn about a fixed axis disposed parallel to said pivots and intermediate the side edges of said bars, and connections joining said member to the respective bars on opposite sides of said axis and operable to move the bars in opposite directions in response to turning of said member.

13. An air flow control damper having, in combination, a plurality of louvers each comprising two plates pivotally connected together along one edge to form an edge hinge, a second pair of plates pivotally connected together along one edge to form a second edge hinge, means pivotally connecting the corresponding other edges of the plates of each pair to form two hinges intermediate the louver edges and unite said four plates to form a tube laterally expansible and contractible by movement of the intermediate hinges away from and toward each other, means supporting one of said edge hinges of the different louvers in fixed spaced parallel relation while leaving the other edge hinge free to float laterally, and means connecting corresponding points of the different louvers and movable in opposite directions to move said intermediate hinges toward and away from each other.

14. An air flow control damper having, in combination, a plurality of louvers each comprising two plates pivotally connected together along one edge to form an edge hinge, a second pair of plates pivotally connected together along one edge to form a second edge hinge, means pivotally connecting the corresponding other edges of the plates of each pair to form two hinges intermediate the louver edges and unite said four plates to form a tube laterally expansible and contractible by movement of the intermediate hinges away from and toward each other, means supporting one of said edge hinges of the different louvers in fixed spaced parallel relation while leaving the other edge hinge free to float laterally, and an actuating bar extending across the ends of said louvers and pivotally connected to corresponding hinges of the different louvers, said bar being movable bodily in opposite directions to respectively expand and contract the louvers.

JOHN L. ORR.

References Cited in the file of this patent

UNITED STATES PATENTS

| Number | Name | Date |
|---|---|---|
| 1,931,356 | Porter | Oct. 17, 1933 |
| 2,149,976 | McKnight | Mar. 7, 1939 |
| 2,303,254 | Bules | Nov. 24, 1942 |

FOREIGN PATENTS

| Number | Country | Date |
|---|---|---|
| 264,186 | Germany | Oct. 24, 1913 |
| 757,063 | France | Oct. 2, 1933 |